United States Patent
Deno et al.

(10) Patent No.: US 6,819,650 B2
(45) Date of Patent: Nov. 16, 2004

(54) OPTICAL DISC HAVING LAND PRE-PITS AND VARIABLE GROOVE DEPTHS

(75) Inventors: Takayuki Deno, Mito (JP); Kenichi Shimomai, Mito (JP); Toyohito Asanuma, Yokohama (JP); Tsutomu Matsumoto, Yokohama (JP); Fumitaka Tsuji, Zama (JP)

(73) Assignee: Victor Company of Japan, Ltd., Kanagawa (JP)

( * ) Notice: Subject to any disclaimer, the term of this patent is extended or adjusted under 35 U.S.C. 154(b) by 82 days.

(21) Appl. No.: 10/042,185

(22) Filed: Jan. 11, 2002

(65) Prior Publication Data

US 2002/0093906 A1 Jul. 18, 2002

(30) Foreign Application Priority Data

Jan. 12, 2001 (JP) ........................................ 2001-004630

(51) Int. Cl.[7] ................................................ G11B 7/24
(52) U.S. Cl. .................................... 369/275.4; 428/64.4
(58) Field of Search ........................... 369/275.4, 275.1, 369/275.2, 277, 278, 279; 428/64.4, 64.1, 64.3; 430/321, 320

(56) References Cited

U.S. PATENT DOCUMENTS

| | | | | |
|---|---|---|---|---|
| 5,604,726 A | * | 2/1997 | Karube | ................... 369/275.4 |
| 6,404,729 B1 | * | 6/2002 | Yamaoka et al. | ........ 369/275.4 |
| 6,490,240 B1 | * | 12/2002 | Usami | ...................... 369/275.4 |
| 6,493,312 B1 | * | 12/2002 | Negishi et al. | .......... 369/275.4 |
| 6,504,815 B1 | * | 1/2003 | Fujii et al. | ................ 369/275.4 |
| 6,590,857 B2 | * | 7/2003 | Ohkubo et al. | .......... 369/275.4 |
| 6,599,607 B1 | * | 7/2003 | Takishita et al. | ........ 369/275.4 |
| 6,673,411 B2 | * | 1/2004 | Koide et al. | ............. 369/275.4 |
| 6,679,430 B2 | * | 1/2004 | Kato et al. | ............... 369/275.4 |
| 6,687,214 B2 | * | 2/2004 | Kato et al. | ............... 369/275.4 |
| 6,704,274 B2 | * | 3/2004 | Takahata et al. | ......... 369/275.4 |

FOREIGN PATENT DOCUMENTS

JP          2000-11460          1/2000

* cited by examiner

Primary Examiner—Tan Dinh
(74) Attorney, Agent, or Firm—Connolly Bove Lodge & Hutz, LLP (57) ABSTRACT

When an LPP (land pre-pit) is formed between shallow grooves or shallow pits, the LPP is formed on a land existing between the shallow grooves or the shallow pits. Further, the LPP is formed in a position displaced from a centerline of the land in the radial direction by a predetermined amount. Furthermore, a laser beam power utilized for forming a shallow groove or a shallow pit adjacent to the LPP is reduced so as to be lower than a regular laser beam power.

5 Claims, 6 Drawing Sheets

OPTICAL DISC HAVING LAND PRE-PITS AND VARIABLE GROOVE DEPTHS

BACKGROUND OF THE INVENTION

1. Field of the Invention

The present invention relates to an optical disc substrate and a manufacturing method of an optical disc master for manufacturing the optical disc substrate.

2. Description of the Prior Art

There existed various types of optical discs such as a read only type, a recordable type and a rewritable type. An optical disc, which is provided with a read only area and a recordable area enabling to be recorded by a user in one substrate, has been proposed and practiced. In an optical disc having a pit area to be a read only area and a groove area to be a recordable area, generally, a pit depth is set to $\lambda/4n$, which is the maximum amplitude of a sum signal of a reproduced signal, wherein $\lambda$ is a wavelength of a laser beam for recording and reproducing and "n" is a refractive index of a substrate of the optical disc. On the other hand, a groove depth is set to $\lambda/8n$, which is the maximum amplitude of a differential signal of a tracking signal. In order to obtain such an optical disc substrate as being formed in one surface with a deep pit and a shallow groove, which are different in depth from each other, it is necessary for a pit and a groove to be varied in depth while forming a photoresist pattern as one process of manufacturing an optical disc master, which is a foundation of manufacturing the optical disc substrate.

Generally, in a process of forming such a photoresist pattern, there existed the method of changing each depth of pit and groove in one substrate such that using a laser beam in stronger intensity forms a pit and using a laser beam in weak intensity forms a groove. A depth of pit is determined by a film thickness of photoresist coated on a surface of substrate. However, a depth of groove depends on an intensity of laser beam and is apt to vary by a change of laser beam intensity or focus signal. A width of groove also depends on laser beam intensity, so that it is extremely hard to obtain an arbitrary width of groove. Further, a shape of groove obtained becomes approximately a V shaped one, so that a stable tracking signal can hardly be obtained. Furthermore, a recording power for recording a signal in a groove is necessary to be more powerful than that for recording in a conventional groove having a rectangular bottom, so that such a V shaped groove is a shape of unsuitable for recording in higher liner velocity.

SUMMARY OF THE INVENTION

Accordingly, in consideration of the above-mentioned problems of the prior art, an object of the present invention is to provide an optical disc substrate and a manufacturing method of the optical disc substrate and an optical disc master provided with a shape of land pre-pit being low in error, wherein a reproduction signal would not be affected by a land pre-pit or a groove adjacent to the land pre-pit when forming a pit and a groove in different depth in one master by using the plasma etching and ashing processes.

In order to achieve the above object, the present invention provides, according to a first aspect thereof, an optical disc substrate comprising: a pit area having pits deep in depth; a groove area having grooves shallow in depth; and a land pre-pit provided between the grooves in one substrate, wherein a depth of a section of one groove allocated inside the land pre-pit in the radial direction is shallower than each depth of grooves surrounding the section of the groove, and wherein a center of the land pre-pit is shifted to the inner circumference direction with respect to the radial direction.

According to a second aspect of the present invention, there provided a manufacturing method of an optical disc master for manufacturing a glass made optical disc master comprising a pit area having pits deep in depth, a groove area having grooves shallow in depth and a land pre-pit provided between the grooves, the manufacturing method comprising steps of: coating photoresist on a glass substrate; forming a pit section by irradiating on the pit area a laser beam having a first power exposing the photoresist as deep as a surface of the glass substrate; forming a groove section shallow in depth by irradiating on the groove area a laser beam having a second power lower than the first power so as not to reach to the surface of the glass substrate; and forming a land pre-pit section on a land existing between the groove section at a position displaced from a centerline of the land by a predetermined amount in the radial direction by irradiating the laser beam having the second power, wherein the laser beam having the second power is changed over to a third power lower than the second power while forming the groove section adjacent to the land pre-pit section, the manufacturing method further comprising steps of: etching only the pit section as deep as a predetermined depth through a plasma etching process; ashing the photoresist as far as a bottom of the land pre-pit reaches to the surface of the glass substrate through an ashing process; forming the pits, the grooves and the land pre-pit by etching the pit section, the groove section and the land pre-pit section so as to become respective predetermined depths through the plasma etching process; and removing the photoresist through the ashing process.

According to a third aspect of the present invention, there provided an optical disc substrate comprising: a first pit area having pits deep in depth; a second pit area having pits shallow in depth; a groove area having grooves shallow in depth and a land pre-pit provided between the pits shallow in depth in one substrate, wherein a depth of a section of one pit allocated inside the land pre-pit in the radial direction is shallower than each depth of pits surrounding the section of the pit, and wherein a center of the land pre-pit is shifted to the inner circumference direction with respect to the radial direction.

According to a fourth aspect of the present invention, there provided a manufacturing method of an optical disc master for manufacturing a glass made optical disc master comprising a first pit area having deep pits, a second pit area having shallow pits, a groove area having shallow grooves and a land pre-pit provided between the shallow pits, the manufacturing method comprising steps of: coating photoresist on a glass substrate; forming a deep pit section by irradiating on the first pit area a laser beam having a first power exposing the photoresist as deep as a surface of the glass substrate; forming a shallow pit section by irradiating on the second pit area a laser beam having a second power lower than the first power so as not to reach to the surface of the glass substrate; and forming a land pre-pit section on a land existing between the shallow pit section at a position displaced from a centerline of the land by a predetermined amount in the radial direction by irradiating the laser beam having the second power, wherein the laser beam having the second power is changed over to a third power lower than the second power while forming the shallow pit section adjacent to the land pre-pit section, the manufacturing method further comprising steps of: etching only the deep pit section as deep as a predetermined depth through a plasma etching process; ashing the photoresist as far as a bottom of the land pre-pit reaches to the surface of the glass substrate through an ashing process; forming the groove, the shallow pits, the deep pits and the land pre-pit by etching the groove section, the shallow pit section, the deep pit section and the land pre-pit section so as to become respective predetermined depths through the plasma etching process; and removing the photoresist through the ashing process.

Other object and further features of the present invention will be apparent from the following detailed description when read in conjunction with the accompanying drawings.

DETAILED DESCRIPTION OF THE PREFERRED EMBODIMENTS

Prior to depicting the preferred embodiment of the present invention, a related art, which is concerned with a fundamental manufacturing process of an optical disc master is explained first as a comparative example.

COMPARATIVE EXAMPLE

In order to solve the problem of the prior art, there provided a related arts such as a method of obtaining a pit and groove having a different depth from each other by using a photoresist pattern having a variety of depths and further by using the plasma etching and ashing processes.

FIGS. 1(a) through 1(e) are exemplary drawings showing a fundamental manufacturing process of an optical disc master according to a related art as the comparative example.

Figure 1A:
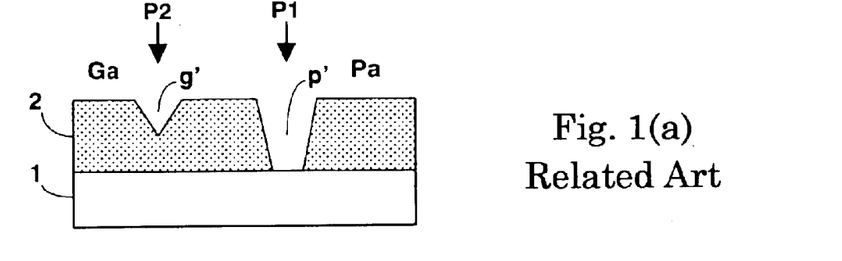
FIGS. 1(a) through 1(e) are exemplary drawings showing a fundamental manufacturing process of an optical disc master according to a related art as a comparative example.
Figure 1B:
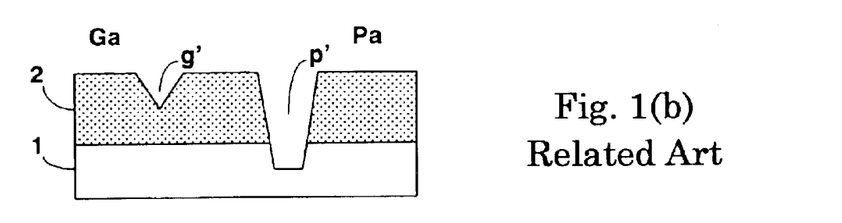
Figure 1C:
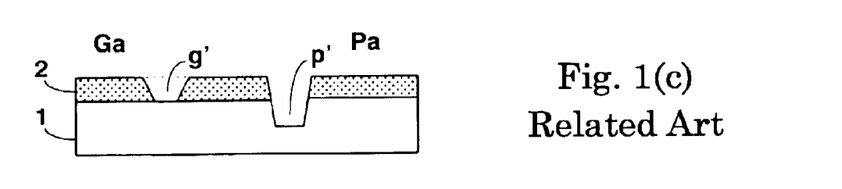
Figure 1D:
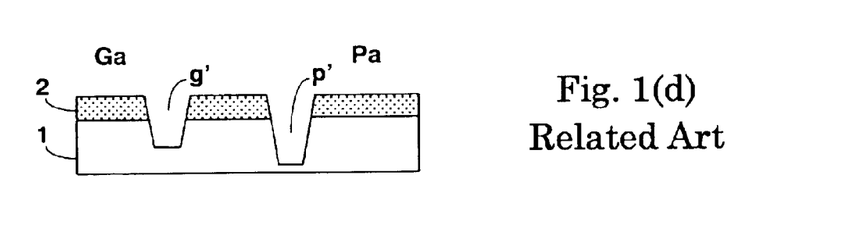
Figure 1E:
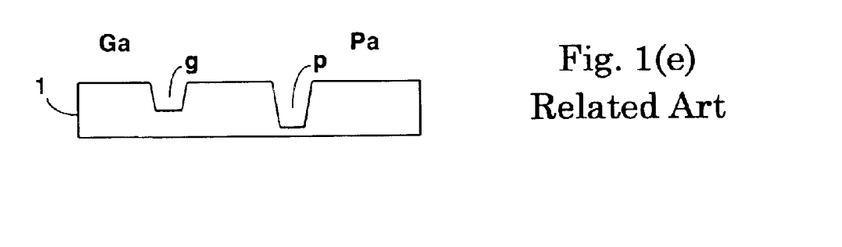

In FIG. 1(a), a surface of a glass substrate 1 is coated with a photoresist 2, and then a pit section "p'", which is arranged in a pit area "Pa" and is an original shape of a pit "p" shown in FIG. 1(e), is formed by using a laser beam P1 in a stronger intensity and a groove section "g'", which is arranged in a groove area "Ga" and is an original shape of a groove "g" shown in FIG. 1(e), is formed by using another laser P2 in a weak intensity. In this process, the pit section "p'" is exposed as deep as its bottom reaches the surface of the glass substrate 1. However, the groove section "g'" is shallower in depth than the pit section "p'" and shaped in a V-letter.

In FIG. 1(b), the glass substrate 1 coated with the photoresist 2 is processed by the plasma etching method first time in an atmosphere of gas such as $CF_4$ or $CHF_3$. As a result of the plasma etching process, etching progresses only at the bottom of the pit section "p'", where the surface of the glass substrate 1 is exposed. However, in the groove section "g'", the photoresist 2 functions as a mask and prevents the etching from progressing. Accordingly, the pit section "p'" is shaped as shown in FIG. 1(b).

In FIG. 1(c), the photoresist 2 is ashed by $O_2$ (oxygen) as far as the bottom of the groove section "g'" reaches to the surface of the glass substrate 1.

In FIG. 1(d), the glass substrate 1 coated with the photoresist 2 shown in FIG. 1(c) is processed by the plasma etching method second time in an atmosphere of gas such as $CF_4$ or $CHF_3$. When the groove section "g'" is etched as deep as the predetermined depth, the pit section "p'" is also etched simultaneously. Accordingly, the deeper pit section "p'" than the groove section "g'" can be obtained. The shape of the groove section "g'" being obtained by the plasma etching process becomes a trapezoid having a flat bottom not a V-letter.

Finally, as show in FIG. 1(e), the glass substrate 1 having a pit "p" and a groove "g" in different depth can be obtained by removing the photoresist 2 completely by the $O_2$ ashing process. Accordingly, a glass master or optical disc master 10 can be obtained.

In order to define an address or sector address of a recording area or groove area of a recordable optical disc, some of recordable optical discs adopt the addressing system called a land pre-pit, hereinafter referred to as "LPP", which is provided with a pit in a land between grooves the same manner as a repeatedly writable digital versatile disc, hereinafter referred to as DVD-RW.

Figure 2:
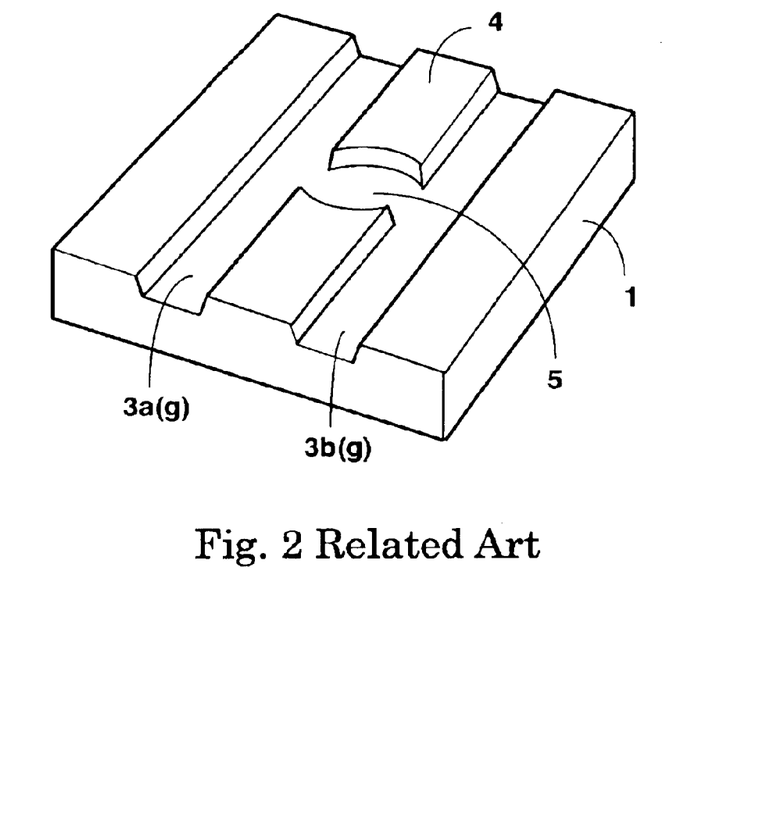
FIG. 2 is a partially cutaway view in perspective of a glass substrate showing a typical LPP according to the related art.

FIG. 2 is a partially cutaway view in perspective of a glass substrate showing a typical LPP. In FIG. 2, a glass substrate 1 is provided with grooves 3a(g) and 3b(g), herein after generically referred to as "3(g)", a land section 4 and an LPP 5.

With respect to a recording method of a DVD-RW disc, for example, the recording method is a groove recording method, which records a signal in the groove 3(g) as shown in FIG. 2. In order to detect an address, an address information is obtained by detecting a change of amplitude of differential signal being obtained while a laser beam spot passes through a side of the LPP 5 provided on the land section 4 in the radial direction.

Figure 3:
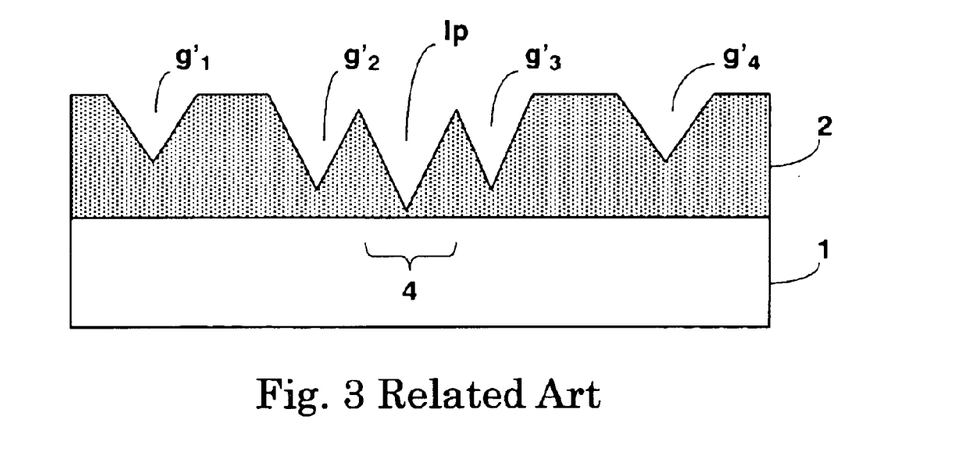
FIG. 3 is a cross sectional view of a glass substrate and photoresist during a forming process of photoresist pattern showing an LPP and its vicinity according to the related art.

FIG. 3 is a cross sectional view of a glass substrate and photoresist during a forming process of photoresist pattern showing an LPP and its vicinity according to the prior art. In FIG. 3, there provided a plurality of groove sections "$g'_1$" through "$g'_4$", hereinafter generically referred to as "g'", and an LPP section "lp" on a photoresist 2 coated on a glass substrate 1.

In the case that the shape of the LLP 5 is formed by using the etching process mentioned above with referring to FIGS. 1(a) through 1(e), while forming the photoresist pattern as shown in FIG. 1(a), the LPP section "lp" is also formed on a land section, which is shown as 4 in FIG. 2, between the groove sections "$g'_2$" and "$g'_3$" as shown in FIG. 3, in conjunction with the groove section "g'". During this forming process of the LPP section "lp", if the LPP section "lp" is exposed by a laser power as same power as exposing the groove section "g'", a depth of the LPP section "lp" formed as mentioned above and the groove section "g'" adjacent to the LPP section "lp" become deeper than that of the groove section "g'" provided in an area not adjacent to the LPP section "lp".

The reason why the depth of the groove section "g'" adjacent to the LPP section "lp" becomes deeper is that an intensity distribution of laser beam utilized for exposing the groove section "g'" and the LPP section "lp" is the Gaussian distribution. Accordingly, fog happens on an exposing area in the LPP section "lp" and the groove section "g'" adjacent to the LPP section "lp". In other words, when exposing the predetermined position on a land section 4 to be formed with the LPP section "lp", a beam spot necessary to exposing exposes the groove section "g'" adjacent to the land section 4 once again. Accordingly, the groove section "g'" is etched much deeper than the predetermined depth.

In a case of a DVD-RW disc of which track pitch is narrow, such a fog phenomenon remarkably happens. There existed many problems when each process of etching and ashing processes as shown in FIGS. 1(a) through 1(e) is performed by using the photoresist pattern shown in FIG. 3.

In a case that the LPP section "lp" is exposed as deep as the surface of the glass substrate 1 by using the photoresist pattern shown in FIG. 3, for example, each depth of the LPP section "lp" and the pit section "p'" becomes the same, so that the depth of the pit section "p'" becomes the same as that of the LPP section "lp" even in the final stage of the process shown in FIG. 1(e). The groove section "g'" adjacent to the LPP section "lp" is exactly the same situation as the pit section "p'". In a case that the groove section "g'" adjacent to the LPP section "lp" is exposed as deep as the surface of the glass substrate 1 by using the photoresist pattern shown in FIG. 3, each depth of the groove section "g'" adjacent to the LPP section "lp" and the pit section "p'" becomes the same, so that the depth of the pit "p" becomes the same as that of the groove "3(g)" adjacent to the LPP 5 even in the final stage of the process shown in FIG. 1(e).

Further, if the depth of the LPP section "lp" and the groove section "g'" adjacent to the LPP section "lp" become deeper than that of the groove section "g'" in the surrounding area, for example, a selection ratio, that is, a ratio of glass etching amount to a photoresist reduction amount becomes smaller even though the LPP section "lp" and the groove section "g'" adjacent to the LPP section "lp" are not exposed as deep as the surface of the glass substrate 1 in the photoresist pattern shown in FIG. 3, each depth of the LPP section "lp" and the groove section "g'" adjacent to the LPP section "lp" become deeper than that of the groove section "g'" in the surrounding area even in the final stage of the process shown in FIG. 1(e).

Furthermore, if a width between the groove sections "g'" in the photoresist pattern shown in FIG. 3 is widened, a fogging area over the LPP section "lp" becomes larger. Consequently, the above-mentioned problems become more serious. Moreover, if a thickness of the photoresist is thinned, driven by necessity, a fogging area over the LPP section "lp" also becomes larger.

In a case that an optical disc, wherein depth of the LPP 5 or the groove "3(g)" adjacent to the LPP 5 is deeper than that of the groove "3(g)" in the surrounding area, is recorded with a signal and reproduced, a serous problem arises such that a signal modulated at the deeper LPP or groove is superimposed on a sum signal as a reproduction signal and an error rate increases extremely.

EMBODIMENT

In order to solve the problems of the prior art and the related art, the present invention provide an optical disc and a manufacturing method of an optical disc master for manufacturing the optical disc substrate.

FIGS. 4(a) through 4(e) are exemplary drawings showing a fundamental manufacturing process of an optical disc master according to an embodiment of the present invention.

Figure 5A:
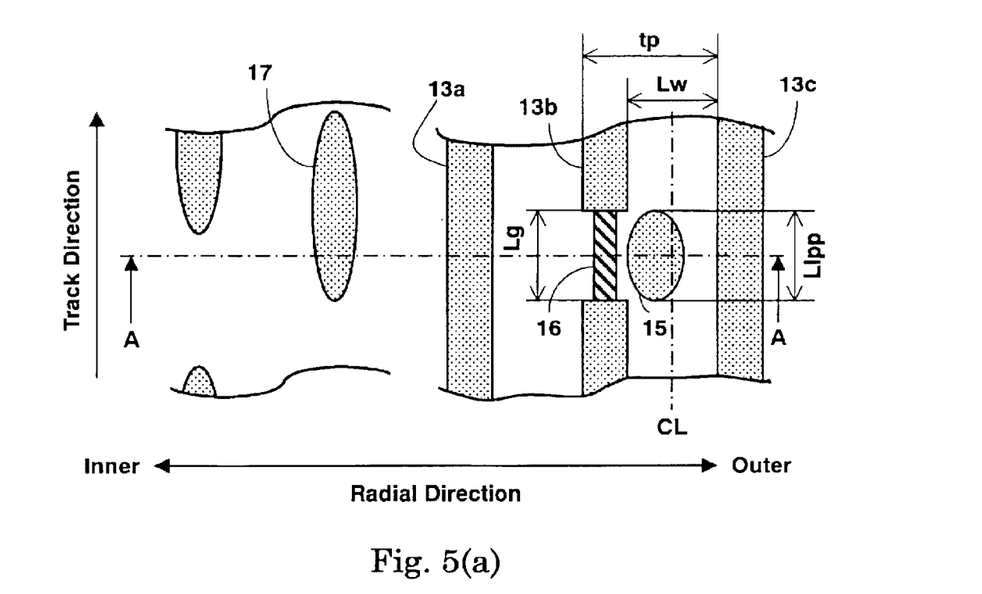
FIG. 5(a) is a fragmentary plan view showing a vicinity of a land pre-pit (LPP) on a optical disc substrate formed through a forming process of the photoresist pattern by a manufacturing method according to the embodiment of the present invention.

FIG. 5(a) is a fragmentary plan view showing a vicinity of a land pre-pit (LPP) on a optical disc substrate formed through a forming process of the photoresist pattern by a manufacturing method according to the embodiment of the present invention.

Figure 5B:
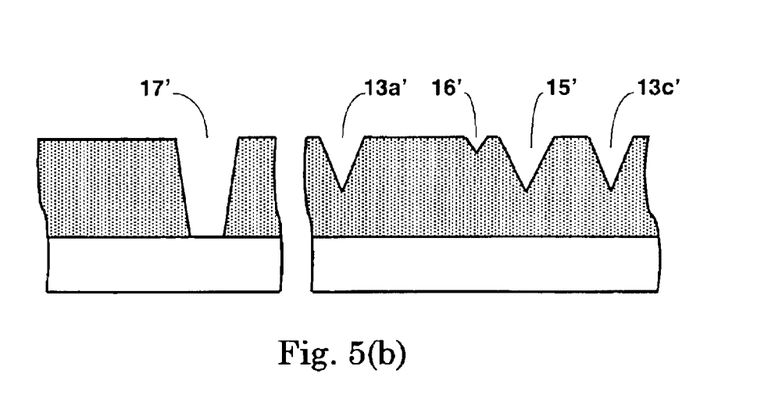
FIG. 5(b) is a cross sectional view of the photoresist pattern on a glass substrate in the middle of the manufacturing process of the optical disc substrate shown in FIG. 5(a) corresponding to be taken substantially along line A—A of FIG. 5(a).

FIG. 5(b) is a cross sectional view of the photoresist pattern on a glass substrate in the middle of the manufacturing process of the optical disc substrate shown in FIG. 5(a) corresponding to be taken substantially along line A—A of FIG. 5(a).

In FIG. 5(a), reference sings 13a through 13c are groove sections, 15 is a land pre-pit (LPP) section, 16 is a part of the groove section 13b having a shallower depth and 17 is a pit. A reference sign "CL" is a centerline of a land having a width of "Lw". Hereinafter, the part 16 of the groove section 13b is referred to as a "shallow groove section 16". Further, a track pitch is "tp", a length of the LPP section 15 in the tracking direction is "Llpp" and a length of the shallow groove section 16 in the track direction is "Lg". In FIG. 5(b), reference signs 13a', 13c', 15', 16' and 17' are original shapes of the deep groove sections 13a and 13b, the LPP 15, the shallow groove section 16 and the pit 17 shown in FIG. 5(a) respectively.

Figure 4A:
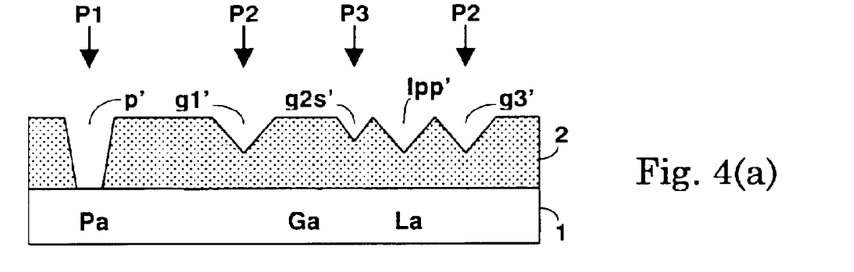
FIGS. 4(a) through 4(e) are exemplary drawings showing a fundamental manufacturing process of an optical disc master according to an embodiment of the present invention.

As shown in FIG. 4(a), photoresist 2 is coated on the surface of a polished silica glass substrate 1 in 100 nm thick and a pit section "p'" is formed in a pit area "Pa" by irradiating a laser beam having a power (first power) "P1" in order to expose the pit section "p'" as deep as the surface of the glass substrate 1, wherein the pit area "Pa" is formed with a pit "p". A depth of the pit section "p'" is 100 nm as same as the thickness of the photoresist 2.

In a groove area "Ga", irradiating a laser beam having a power (second power) "P2" lower than the laser beam having the first power "P1" utilized for forming the pit section "p'" forms groove sections "g1'" through "g3'" so shallow as not to reach down to the surface of the glass substrate 1, wherein the groove area "Ga" is formed with grooves "g1" through "g3". Actually, the groove sections "g1'" through "g3'" are formed by a laser beam having a predetermined power such that a depth of groove becomes 50 nm.

Further, an LPP section "lpp'" is formed between the grove sections "g2" (not shown) and "g3" by using the laser beam having the second power "P2". A depth of the LPP section "lpp'" is also 50 nm. Furthermore, a part of the grove sections "g2" (not shown) is formed as a shallow groove section "g2s'" by using a laser beam having a power (third power) "P3" lower than the laser beam having the second power "P2".

As shown in FIG. 5(a), when an LPP section 15 is formed between groove sections 13b and 13c, the LPP section 15 is displaced to the inner radial direction from the centerline "CL" of the land so far that a depth of the groove section 13c, which is arranged in an outer circumferential area of the LPP section 15 in the radial direction, does not exceed 50 nm. During this process, in order to prevent the depth of the groove section 13b allocated inside the LPP section 15 from exceeding 50 nm, a depth of the shallow groove section 16 is made shallower by reducing a laser beam power to the third power for forming the groove section 13a. Accordingly the shallow groove section 16 is formed with being adjacent to the LPP 15.

Further, in a case that an LPP is formed between shallow pits of which depth is a same as that of a groove, a photoresist pattern is formed so as for the shallow pits to be 50 nm and a position of the LPP is displaced to the inner radial direction from a centerline of land. Then, reducing a power of laser beam for forming a pit being adjacent to and allocated inside the LPP from the second power forms the pit so as to be shallower depth.

In the embodiment of the present invention, a depth of the LPP section 15 and a depth of the shallow groove section 16 are designated to be 50 nm and 20 nm respectively.

Furthermore, it is acceptable that the shallow groove section 16 can be assigned to be a land without exposing the part 16 by turning off a laser beam power completely. A cross sectional view of the photoresist pattern having such a land formed by the part 16 is shown as 16' in FIG. 5(b).

Figure 4B:
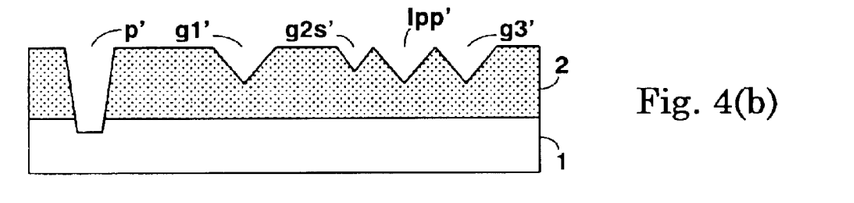

As shown in FIG. 4(b), a first time plasma etching process is performed in an atmosphere of $CHF_3$ gas. By the plasma etching process, the etching progresses only in an exposing surface of the glass substrate 1 in the pit section "p'" and does not progress in the groove sections "g1'" through "g3'" or an LPP section "lpp'" because the photoresist 2 functions as a mask. Accordingly, a total shape shown in FIG. 4(b) is obtained, wherein an etching amount of the pit section "p'" is designated to be 65 nm in depth.

Figure 4C:
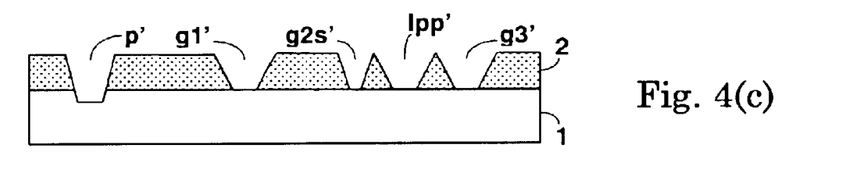

As shown in FIG. 4(c), the photoresist 2 is processed by the $O_2$ ashing as far as bottoms of the groove sections "g1'" and "g3'" and the LPP section "lpp'" reach down to the surface of the glass substrate 1, wherein an ashing amount of the photoresist 2 is designated to be 70 nm in depth and a residual film thickness of the photoresist 2 is approximately 30 nm.

Figure 4D:
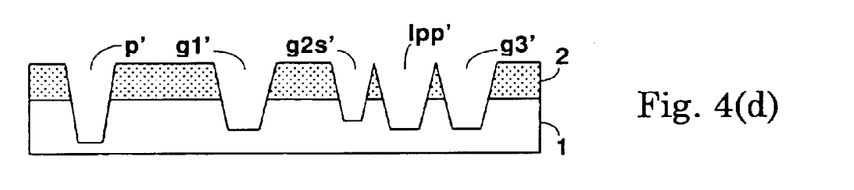

As shown in FIG. 4(d), a second time plasma etching process is performed in an atmosphere of $CHF_3$ gas. Actually, etching is performed for the groove sections "g1'" and "g3'" and the LPP section "lpp'" so as to be 25 nm in etching depth. In this etching process, the pit section "p'" is also etched simultaneously, so that an etching depth of the pit section "p'" becomes 90 nm in total including the etching depth by the first time plasma etching.

Figure 4E:
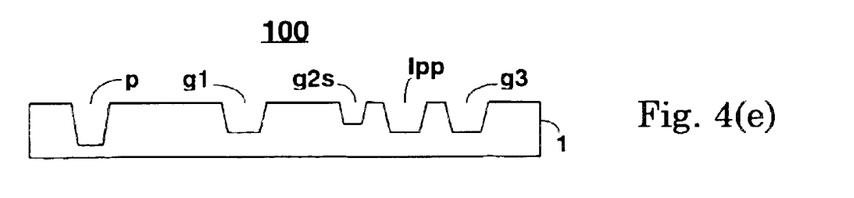

Finally, as shown in FIG. 4(e), a glass master or optical disc master 100, which is composed of the glass substrate 1 having a pit "p" in 90 nm deep, grooves "g1" and "g3" in 25 nm deep, a shallow groove "g2s" in 20 nm and an LPP "lpp" in 25 nm deep, can be obtained by removing the photoresist 2 completely through the $O_2$ ashing process. In a case that a shallow pit pattern is formed on a photoresist, a depth of the shallow pit also becomes 25 nm. Further, preferable depth of a deep pit, a groove, an LPP and a shallow groove are 80 to 130 nm, 20 to 30 nm, 20 to 30 nm and 0 to 29 nm respectively.

A shape of such a groove as obtained by the above-mentioned processes becomes a trapezoid having a flat bottom not a V-letter because the groove is formed by the plasma etching process. Accordingly, a stamper is manufactured from the optical disc master 100 obtained as mentioned above, and then a polycarbonate made optical disc substrate is manufactured through the injection molding. In addition thereto, conditions of the plasma etching and ashing processes are not limited to the parameters mentioned above. They can be altered in accordance with necessity.

The optical disc substrate of the present invention obtained as mentioned above is composed of following constitution. As shown in FIG. 5(a), the optical disc substrate is composed of a pit area having the deep pit 17, which is arranged in the inner circumference area of the optical disc substrate, and a groove area having the grooves 13a through 13c of which depth is shallower than that of the pit 17. The optical disc substrate is further composed of the LPP 15 allocated between the grooves 13b and 13c and the part 16 of the groove 13b or the shallow groove 16, which is allocated with being adjacent to the LPP 15 in the inner radial direction and is shallower in depth than a depth of its neighboring area.

With defining that a length of the shallow groove 6 in the track direction, a length of the LPP 15 in the track direction, a track pitch and a width of land are "Lg", "Llpp", "tp" and "Lw" respectively, the optical disc substrate is characterized by "0.2 tp<Llpp<tp" and "0.5 Llpp<Lg<2 Llpp". The optical disc substrate is further characterized in that a center position of the LPP 15 is within a range of "−0.75×Lw/2≦(the center position of the LPP 15)<0", wherein it is defined that the center position of the LPP 15 and the inner radial direction are respectively "0" (zero) and "−" (minus) with respect to the radial direction.

Furthermore, the optical disc substrate of the present invention is composed of a first pit area having a deep pit, a second pit area having a shallow pit and a groove area having a shallow groove in one substrate. The optical disc substrate is further composed of an LPP allocated between the shallow pits and a part of pit section, which is allocated with being adjacent to the LPP in the inner radial direction and is shallower in depth than a depth of its neighboring area.

With defining that a length of the part of pit section in the track direction, a length of the LPP in the track direction, a track pitch and a width of land are "Lg'", "Llpp'", "tp'" and "Lw'" respectively, the optical disc substrate is characterized by "0.2 tp'<Llpp'<tp'" and "0.5 Llpp'<Lg'<2 Llpp'". The optical disc substrate is further characterized in that a center position of the LPP is within a range of "−0.75×Lw'/2≦(the center position of the LPP)<0", wherein it is defined that the center position of the LPP is "0" (zero) and the inner radial direction is "−" (minus) with respect to the radial direction.

Figure 6A:
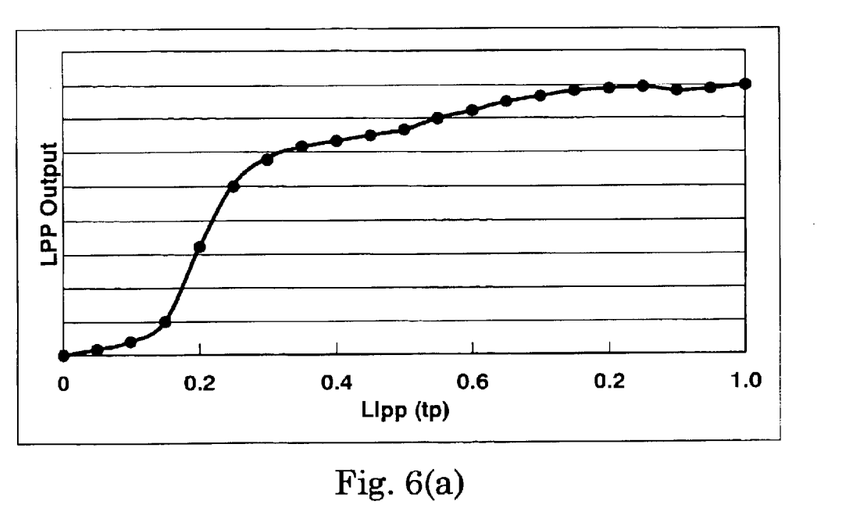
FIGS. 6(a) through 6(c) are graphs showing signal characteristics of an optical disc manufactured by using the optical disc substrate according to the present invention.
Figure 6B:
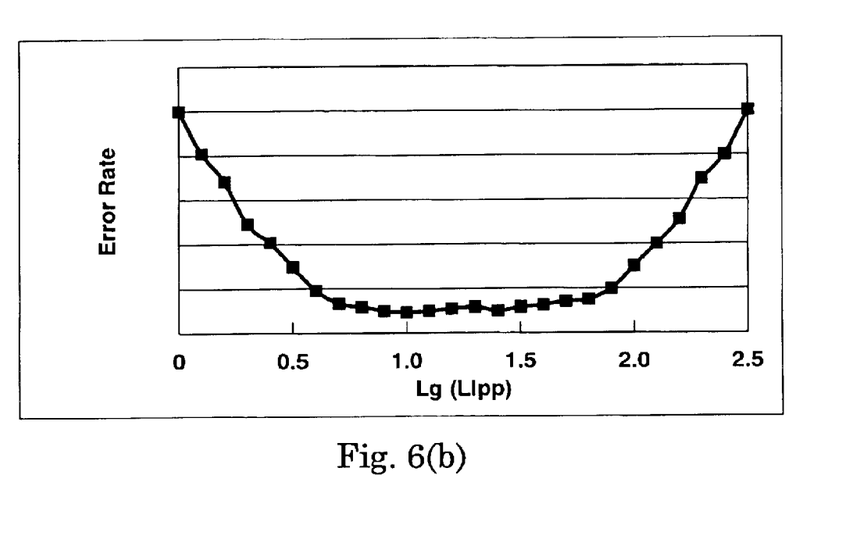
Figure 6C:
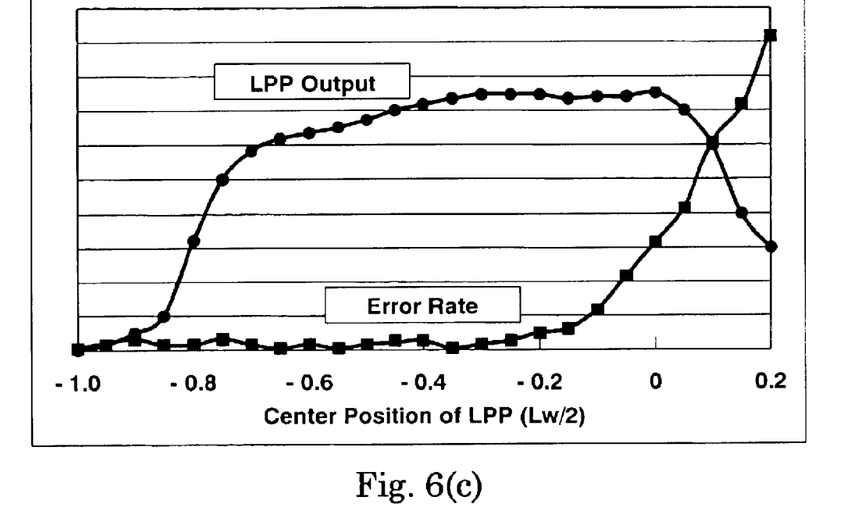

FIGS. 6(a) through 6(c) are graphs showing signal characteristics of an optical disc manufactured by using the optical disc substrate according to the present invention.

Figure 7:
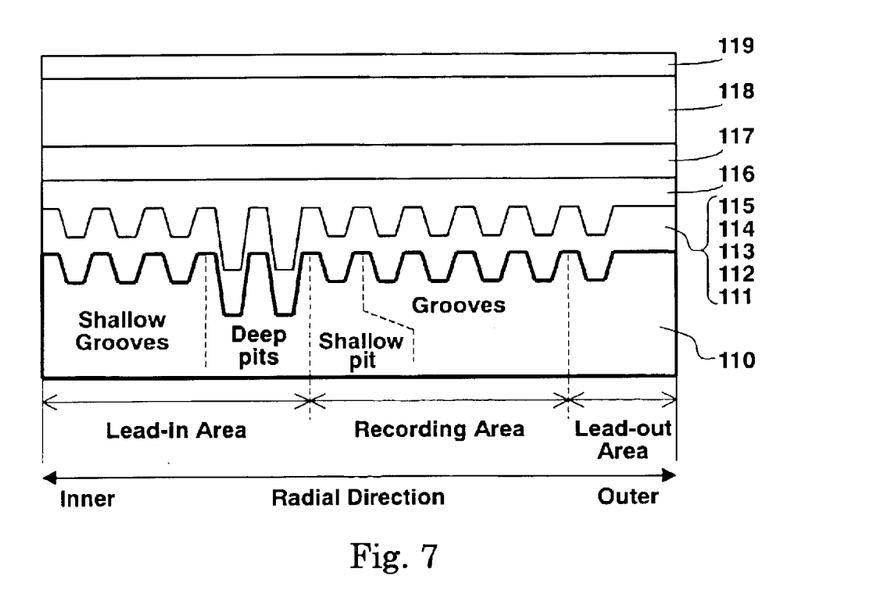
FIG. 7 is a cross sectional view of an optical disc manufactured by using the optical disc substrate according to the present invention.

FIG. 7 is a cross sectional view of an optical disc manufactured by using the optical disc substrate according to the present invention.

The optical disc substrate mentioned above is a disc substrate of plastic formed by a disc stamper, which is manufactured directly from the glass master 100 shown in FIG. 4(e) or duplicated from the glass master 100 through predetermined processes. An example of such the optical disc substrate is a disc substrate 110 in FIG. 7.

In FIG. 7, the disc substrate 110 is composed of a lead-in area, a recording area and a lead-out area, which are arranged in order from the inner circumference to the outer circumference in the radial direction. In the lead-in area, there provided with shallow grooves and deep pits. The shallow grooves are arranged within an inner circumferential area of the lead-in area. The recording area is provided with a shallow pit and grooves. Further, the lead-out area is provided with a shallow groove.

As shown in FIG. 7, the disc substrate 110 is formed with a $ZnS$—$SiO_2$ dielectric film 111, a GeN intermediate layer 112, an AgInSbTe recording film 113, a ZnS—SiO$_2$ dielectric film 114 and an Al reflection film 115 laminated in order by the sputtering process, and further formed with a UV coat protective film 116 by coating ultra violet curable resin over the lamination by the spin coat process. A dummy polycarbonate substrate 118 is laminated over the UV coat protective film 116 through a sticking sheet 117 and a printing 119 is printed on the dummy polycarbonate substrate 118. Accordingly, a phase change recording type optical disc is finally manufactured.

In addition thereto, while the invention has been described above with reference to the specific embodiment thereof, it is apparent that many changes, modifications and variations and in materials can be made without departing from the invention concept disclosed herein. For example, materials and forming methods and processes of a disc substrate, a dielectric film, an intermediate layer, a recording film, a dielectric film, a reflection film, a protective film, a sticking sheet and a dummy substrate are not limited to those disclosed in this embodiment.

The optical disc manufactured as mentioned above is recorded with a signal, and then reproduced. A recording and reproducing method is processed by irradiating a laser beam having a wavelength of 650 nm to a recording film on a groove through a pickup having numerical aperture NA of 0.6. Further, it is apparent that a tracking and focus serve is applied so as to focus the laser beam on a recording film properly while recording and reproducing. Furthermore, amplitude of a push-pull waveform reproduced from a manufactured optical disc is uniform and a tracking signal of the optical disc according to the present invention is stable while tracking is performed by a push-pull signal when recording.

With defining that a length of an LPP of the optical disc manufactured, a track pitch and a length of a part of groove allocated inside the LPP and being shallower in depth than a groove in its surrounding area are "Llpp", "tp" and "Lg" respectively, a relationship between an "Llpp" and an output of the LPP is shown in FIG. 6(a). The output of the LPP is obtained by processing a signal outputted from a four-division photo-detector. In other words, the output is a numerical value of a push-pull signal standardized by total luminous energy. In FIG. 6(a), the X-axis shows a ratio of "Llpp" to "tp" and the Y-axis shows an output of the LPP, wherein "Lg/Llpp" is one and a center of the LPP, that is, "Lw/2" is equal to −0.5. In a case that the "Llpp" is less than 0.2 tp, a sufficient LPP output necessary to detecting an address can not be obtained. Further, in a case that the "Llpp" is more than "tp", an LPP output saturates and results in meaningless practically.

A relationship between an error rate and an "Lg" is shown in FIG. 6(b). In FIG. 6(b), the X-axis shows a ratio of "Lg" to "Llpp" and the Y-axis shows a PI (inner-code parity) error rate of a recorded signal in groove, wherein "Llpp/tp" is 0.5 and a center of the LPP, that is, "Lw/2" is equal to −0.5. In a case that the length "Lg" is less than 0.5 Llpp, an error rate increases. In a specific case "Lg=0" corresponding to the conventional manufacturing method, an error rate is relatively high. The specific case is as follows: during a forming process of photoresist pattern, fog happens at a part in a boundary area between the LPP and a groove adjacent to and allocated inside the LPP in the inner radial direction, a depth of groove at the part becomes deeper than that of circumference grooves after the etching process. Consequently, the deeper groove affects a reproduction signal of a recorded signal in groove. In a case that the length "Lg" is within a range of "0.5 Llpp<Lg<2 Llpp", an error rate becomes extremely low. In a case that the length "Lg" is more than "2 Llpp", the part of "Lg" in length, which is shallow in depth, is modulated and affects a reproduction signal of recorded signal in groove. Consequently, an error rate increases.

In a case that a center of the LPP is allocated in a range of "−0.75×Lw/2≦(Center position of the LPP)<0", wherein the center of the land and the inner radial direction are defined as "0" (zero) and "−" (minus) respectively and further a position of an inner circumferential groove is "−1" with respect to the radial direction, there existed no practical problem in an LPP output and error rate of recorded signal in groove. However, the center position of the LPP is shifted to the inner circumferential side by more than "−0.75×Lw/2", an enough LPP output can not be obtained. Further, in a case that the center position of the LPP exceeds "0" (zero), that is, the center position of the LPP crosses the centerline "CL" of the land to the outer circumference side, some of grooves adjacent to the outer circumference become deeper in depth than that of grooves adjacent to the LPP. Consequently, an error rate increases. A relationship among the center position of the LPP, an LPP output and an error rate is shown in FIG. 6(c). In FIG. 6(c), the X-axis shows a center position of the LPP and the Y-axis shows an LPP output and a PI error rate of the recorded signal in groove, wherein "Llpp/tp" is 0.5 and "Lg/Llpp" is equal to one.

The LPP and the part of the groove adjacent to the LPP of the optical disc manufactured as mentioned above never become deeper in depth than a depth of grooves surrounding the LPP, so that the LPP and the groove adjacent to the LPP never affect quality of a groove recording. Accordingly, an optical disc extremely low in error of recorded signal in groove and high in LPP output can be obtained. Further, an amplitude change of differential signal being sufficient for detecting an address signal can also be obtained. Furthermore, an optical disc substrate being stable in a tracking signal can be obtained.

In addition thereto, the present invention will not restrict a groove containing a wobble signal in a single frequency, which makes the groove meander periodically in the radial direction.

According to an aspect of the present invention, as depicted above, there provided an optical disc substrate, which is extremely low in error of recorded signal in groove, high in LPP output and stable in a tracking signal. While forming a pit and a groove in different depth in one substrate by using the plasma etching and ashing processes and further forming an LPP between shallow grooves or shallow pits through a forming process of photoresist pattern, the optical disc substrate is composed of following configurations: allocating the LPP inside a center of a land in the radial direction toward the inner circumference, reducing a laser beam power being utilized for forming a groove or a pit allocated inside the LPP in the inner radial direction at a position to be provided with the LPP and shifting a center of the LPP to the inner circumferential direction. By using such the optical disc substrate having the above-mentioned configurations, the LPP and the groove adjacent to the LPP never affect recording quality of groove. Accordingly, an optical disc substrate, which is excellent in error of a recorded signal in groove, in output of an LPP and in stability of a tracking signal, can be obtained.

What is claimed is:

1. An optical disc substrate comprising:
a pit area having pits deep in depth;
a groove area having grooves shallow in depth; and a land pre-pit provided between the grooves in one substrate, wherein a depth of a section of one groove allocated inside the land pre-pit in the radial direction is shallower than each depth of grooves surrounding the section of the groove, and wherein a center of the land pre-pit is shifted to the inner circumference direction with respect to the radial direction.

2. The optical disc substrate in accordance with claim 1, the optical disc substrate is further characterized by "0.2 tp<Llpp<tp" and "0.5 Llpp<Lg<2 Llpp", wherein it is defined that a length of the section of the groove in the track direction, a length of the land pre-pit in the track direction, a track pitch and a width of the land are "Lg", "Llpp", "tp" and "Lw" respectively, and furthermore characterized in that a center position of the land pre-pit is within a range of "−0.75×Lw/2<(center position of the land pre-pit)<0", wherein it is defined that a center of the land is "0" (zero) and the inner circumference direction is "−" (minus) with respect to the radial direction.

3. The optical disc substrate in accordance with claim 1, wherein each of the pits and the grooves and the land pre-pit has approximately a trapezoidal cross-sectional shape.

4. An optical disc substrate comprising:
a first pit area having pits deep in depth;
a second pit area having pits shallow in depth;
a groove area having grooves shallow in depth; and
a land pre-pit provided between the pits shallow in depth in one substrate, wherein a depth of a section of one pit allocated inside the land pre-pit in the radial direction is shallower than each depth of pits surrounding the section of the pit, and wherein a center of the land pre-pit is shifted to the inner circumference direction with respect to the radial direction.

5. The optical disc substrate in accordance with claim 4, wherein each of the pits and the grooves and the land pre-pit has approximately a trapezoidal cross-sectional shape.

* * * * *